United States Patent [19]

M'Sadoques et al.

[11] 4,093,970

[45] June 6, 1978

[54] MAIN LUG ASSEMBLY FOR CIRCUIT BREAKER LOAD CENTERS

[75] Inventors: Andre J. M'Sadoques, Wolcott; Robert J. Sabatella, Southington, both of Conn.

[73] Assignee: General Electric Company, New York, N.Y.

[21] Appl. No.: 754,553

[22] Filed: Dec. 27, 1976

[51] Int. Cl.² .............................................. H02B 1/04
[52] U.S. Cl. .................................... 361/361; 361/355; 174/70 B; 361/356
[58] Field of Search .......... 339/198 R, 198 N, 198 G, 339/22 B; 174/70 B; 361/346, 353, 354, 355, 356, 358, 361, 363, 426

[56] References Cited

U.S. PATENT DOCUMENTS

| | | | |
|---|---|---|---|
| 3,418,536 | 12/1968 | Jacobs | 361/353 |
| 3,694,701 | 9/1972 | Stanback | 339/198 N |
| 3,848,161 | 11/1974 | Clement | 174/70 B |

Primary Examiner—Gerald P. Tolin
Attorney, Agent, or Firm—Robert A. Cahill; Walter C. Bernkopf; Frank L. Neuhauser

[57] ABSTRACT

In a circuit breaker load center there is provided a main lug assembly constructed for interchangeable installation with a main circuit breaker. The lug assembly comprises an insulative mounting block to which are secured a pair of conductive straps in closely spaced parallel relation. An upstanding barrier wall integral with the block provides electrical isolation between the straps, as well as between wire connector lugs affixed in electrical connection to one end portion of each strap. The block is notched to expose the other terminal end portion of each strap for electrical connection to terminal ends of the load center busbars.

2 Claims, 4 Drawing Figures

U.S. Patent
June 6, 1978
4,093,970
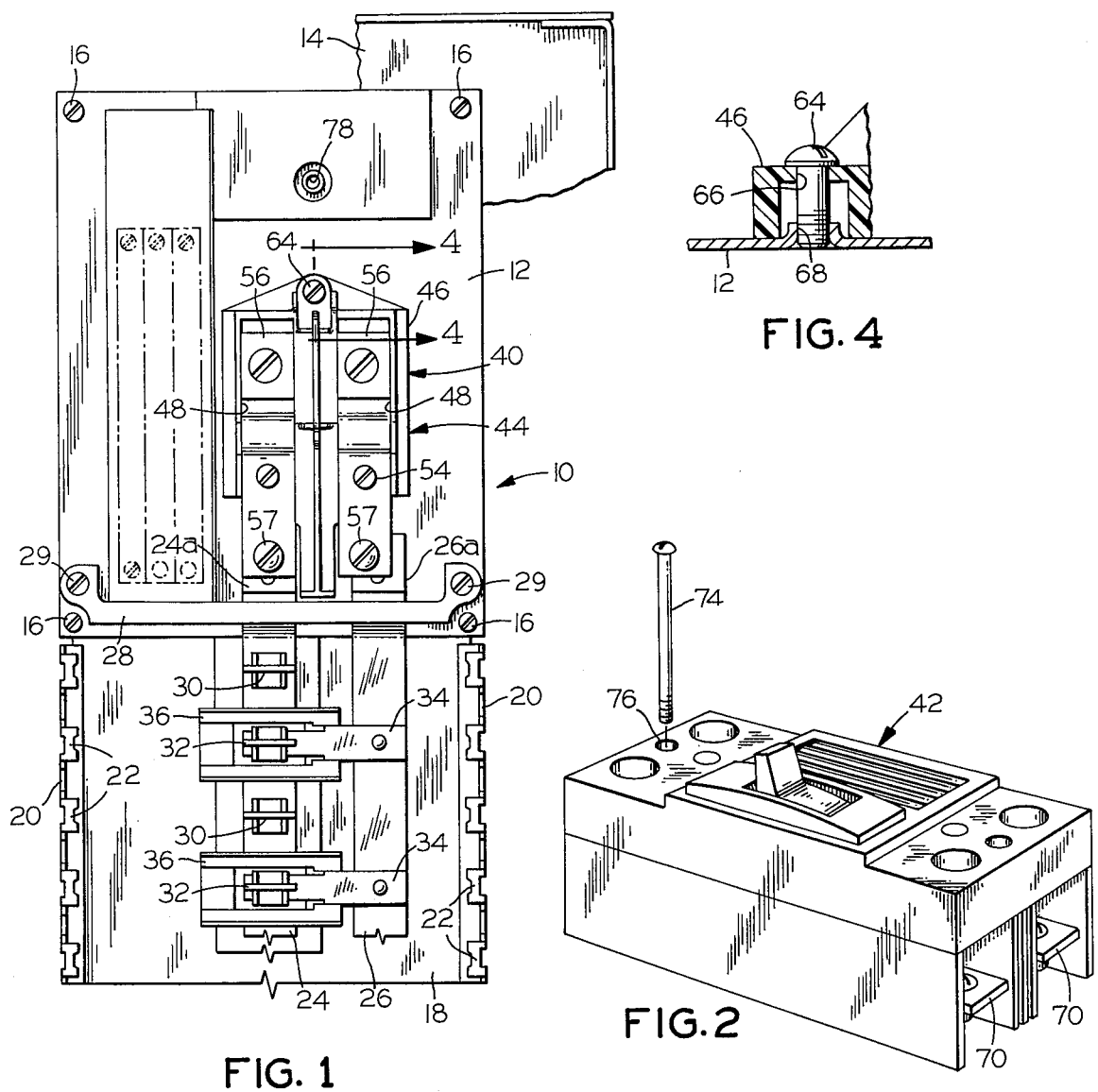
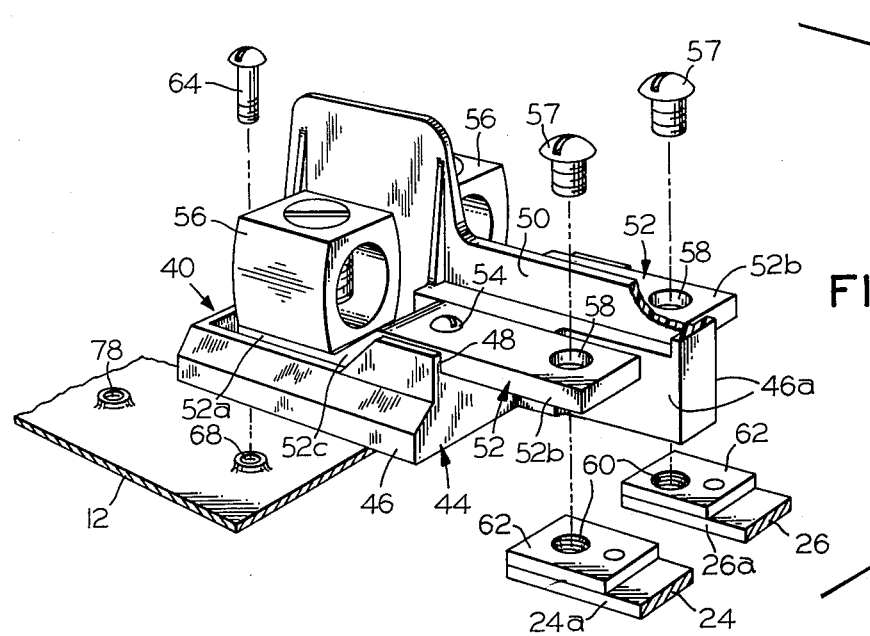
FIG. 1
FIG. 2
FIG. 3
FIG. 4

MAIN LUG ASSEMBLY FOR CIRCUIT BREAKER LOAD CENTERS

BACKGROUND OF THE INVENTION

Circuit breaker load centers or panelboards for residential and light industrial applications are typically of two basic configuration. For most installations, energization of the load center busbars is through a main circuit breaker. However, in some installations, the circuit protection afforded by a main circuit breaker is not needed, in which case main lugs are provided to electrically connect the service entry cables directly to the load center busbars. Typically, the two basic configurations have required different load center designs which is costly both from a manufacturing and inventory standpoint. Moreover, field changeover from one configuration to the other has required substituting load centers, an inconvenient and expensive proposition.

It is accordingly an object of the present invention to provide a main lug assembly which is adapted for interchangeable installation with a main circuit breaker in a load center or panelboard.

Another object of the invention is to provide a circuit breaker load center capable of accepting either a main circuit breaker or a main lug assembly, depending upon the configuration desired for a particular installation.

A further object is to provide a main lug assembly for a circuit breaker load center which is convenient to install and wire, and is safe and reliable in service.

Other objects of the invention will in part be obvious and in part appear hereinafter.

SUMMARY OF THE INVENTION

In accordance with the present invention, there is provided a circuit breaker load center which is designed to interchangeably accept either a main circuit breaker or a main lug assembly. The load center includes a pair of elongated busbars mounted in parallel, spaced, electrically isolated relation. Stab electrical connectors are affixed to the busbars at locations distributed along their lengths, such as to accept plug-on electrical connected with plural branch circuit breakers. The busbars extend through a molded, insulative barrier block which assists in maintaining the spatial relation of the busbars, as well as mounting them to the load center enclosure. The extremities of the busbars beyond the barrier block provide terminal end portions adapted for electrical connection with either a main circuit breaker or a main lug assembly.

The main lug assembly of the invention includes a molded, insulative mounting block to which are affixed a pair of spaced, parallel conductive straps. A central, upstanding barrier wall, integral with the mounting block and co-extensive with the straps, ensures electrical isolation between the straps, as well as wire connector lugs affixed in electrical connection to a corresponding one end of each strap. The barrier wall rises above the straps and lugs, such as to reduce the possibility of a foreign conductive object coming into bridging contact with this line part.

The mounting block is notched to expose the other end of each strap opposite from the lugs. These side-by-side exposed strap ends provide terminal portions accessible for electrical connection to the busbar terminal end portions located beyond the barrier block. This electrical connection may be achieved by screws extending through clearance holes in the strap terminal ends and threaded in to tapped holes in the busbar terminal ends. The physical mounting of the main lug assembly in the load center is achieved in part by the electrical connection of the straps to the busbars and in part by a suitable fastener, such as screw affixing the mounting block to the load center.

The invention accordingly comprises the features of construction and arrangement of parts which will be exemplified in the construction hereinafter set forth, and the scope of the invention will be indicated in the claims.

For a better understanding of the nature and objects of the inventions, reference should be had to the following detailed description taken in conjunction with the accompanying drawing, in which:

FIG. 1 is a plan view of a portion of a circuit breaker load center, illustrating the adaption therein of a main lug assembly in accordance with the present invention;

FIG. 2 is a perspective view of a main circuit breaker which may be interchangeably installed in lieu of the main lug assembly in the load center of FIG. 1;

FIG. 3 is a perspective view of the main lug assembly shown in FIG. 1; and

FIG. 4 is a sectional view taken along line 4—4 of FIG. 1.

Corresponding reference numerals refer to like parts throughout the several views of the drawing.

DETAILED DESCRIPTION

Turning to FIG. 1 of the drawing, a circuit breaker panelboard or load center, generally indicated at 10, has a base or saddle 12 (the lower portion broken away) which is mounted to an enclosure, fragmentarily shown at 14, by threaded fasteners 16. The saddle has a generally planar central portion 18, the lower portion of which is formed with upstanding sidewalls 20 terminating in a multiplicity of spaced hook portions 22.

A pair of elongated busbars 24 and 26 are mounted adjacent their upper ends by a molded insulative barrier block 28 affixed to the saddle by threaded fasteners 29; the extremities of busbars 24, 26 extending through openings in block 28 to present thereabove terminal end portions 24a, 26a, respectively. The busbars are mounted to the saddle adjacent their lower ends by a second molded insulative barrier block (not shown) for extension in parallel, spaced relation intermediate the saddle sidewalls 20. Suitable sheet insulation is provided to electrically isolate the busbars from each other and from the saddle 12. Affixed to busbar 24 are a plurality of vertically spaced stab connectors 30 which accept plug-on electrical engagement by line terminal contact jaws of branch molded case circuit breakers (not shown); physically mounting of each branch breaker being assisted in conventional fashion by hook 22 which engages in a recess provided in the lower load end of the breaker case. Positioned between stab connectors 30 in overlying relation with busbar 24 are identical stab connectors 32 which are fed from busbar 26 via electrically interconnecting straps 34. Electrically isolation between stab connectors 32 and busbar 24 is provided by molded insulators 36. Stab connectors 32 likewise acccept plug-on electrically engagement with branch breakers (not shown) held in position by hooks 22.

The circuit breaker load center 10 is structured such that the busbars 24, 26 may be energized via a main lug assembly, generally indicated at 40 in FIGS. 1 and 3, or a two-pole molded case, main circuit breaker, generally indicated at 42 in FIG. 2. As best seen in FIG. 3, the main lug assembly 40 includes a molded insulative mounting block 44 having a base 46 in which are formed a pair of tiered recesses 48 (FIG. 1) separated by an integrally formed, upstanding barrier wall 50. Each recess accommodates a strap 52 having a connector end portion 52a and an offset terminal end portion 52b integrally joined by an angular portion 52c. Screws 54 threaded into base 46 secure the straps in their respective recesses. A wire lug 56 is secured by suitable means in electrical contacting engagement with the connector end portion 52a of each strap 52. Base 46 is notched at its lower corners, as indicated at 46a, to leave free standing the terminal end portion 52b of each strap for convenient installation of the main lug assembly 40 in the circuit breaker load center 10.

Still referring to FIGS. 1 and 3, to install the main lug assembly, mounting block 44 is positioned to bring the strap terminal end portions 52b into overlying relation with the terminal end portions 24a, 26a of the busbars. Screws 57 are then passed through clearance holes 58 in the strap terminal ends and threaded into bores 60 in the busbar terminal ends to perfect bolted electrical joints interconnecting each wire lug to its associated busbar. If required, conductive spacers 62 are affixed to the busbar terminal ends to accommodate differences in the relative depths of the strap and busbar terminal ends. As best seen in FIGS. 1 and 4, a screw 64, preferably held captive in a hole 66 in base 46, is threaded into tapped hole 68 (FIG. 4) in saddle 12 to complete mechanical installation of main lug assembly 40. It will be appreciated that to complete electrical installation, service entry cables (not shown) are brought into the load center 10 and their insulation-free end are clamped in wire lugs 56.

On the other hand, if the load center is to be adapted to a main breaker configuration rather than a main lug configurations as above described, the circuit breaker 42 of FIG. 2 is installed. To this end, the breaker is vertically positioned with its load terminal straps 70 in overlying relation with the terminal ends 24a, 26a of busbars 24, 26. Screws 57 are then utilized to perfect bolted electrical joints between the breaker load straps and the busbar terminal ends. Mechanical installation of the main breaker 42 is then completed using an elongated screw 74 which is passed through a clearance hole 76 in the breaker case and threaded into a tapped hole 78 in the saddle. The service entry cable (not shown) is then electrically connected to the breaker line terminals in a conventional manner to complete electrical installation of the main breaker in the load center.

From the foregoing description it is seen that the present invention provides a circuit breaker which accepts interchangeable main circuit breakers or main lug assemblies. The main lug assembly of the invention is designed for convenient mechanical installation and its electrical joint making facilities are readily accessible for convenient electrical installation. Electrical isolation between circuit poles is insured by the construction of mounting block 44, particularly through the provision of upstanding wall 50 which is sufficiently high as to reasonably prevent shorting of the circuit poles by a foreign, conductive object.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. A load center comprising, in combination:
   A. an enclosure;
   B. a pair of spaced, side-by-side, elongated busbars disposed within said enclosure;
   C. a series of stab connectors affixed to said busbars at locations distributed along the lengths thereof, said stab connectors individually adapted to accept plug-on electrical connection with a branch circuit breaker;
   D. an insulator secured to said enclosure and having openings through which said busbars extend to present therebeyond busbar terminal end portions;
   E. a main lug assembly including
      1. an insulative mounting block secured to said enclosure,
      2. means forming a pair of recesses in said block,
      3. a separate conductive strap accommodated in each said recess and affixed to said block,
      4. a wire lug affixed to one end portion of each said strap; and
      5. means notching said mounting block to expose the other end portion of each said strap as a terminal end portion disposed in lapped relation with an associated one of said busbar terminal end portions, and
      6. an insulative barrier wall upstanding from said mounting block intermediate said recesses and extending coextensively with said straps as accommodated therein, said barrier wall rising to a level well above said straps and said wire lugs; and
   F. means formed in said terminal end portions of lapped busbars and straps for accepting threaded fasteneres pursuant to perfecting bolted joints therebetween.

2. The load center defined in claim 1, which further includes means for securing a main circuit breaker to said enclosure in place of said main lug assembly, said threaded fastener accepting means formed in said busbar terminal end portions accommodating the perfection of bolted joints with load terminal straps of the main circuit breaker.

* * * * *